Figure 1:
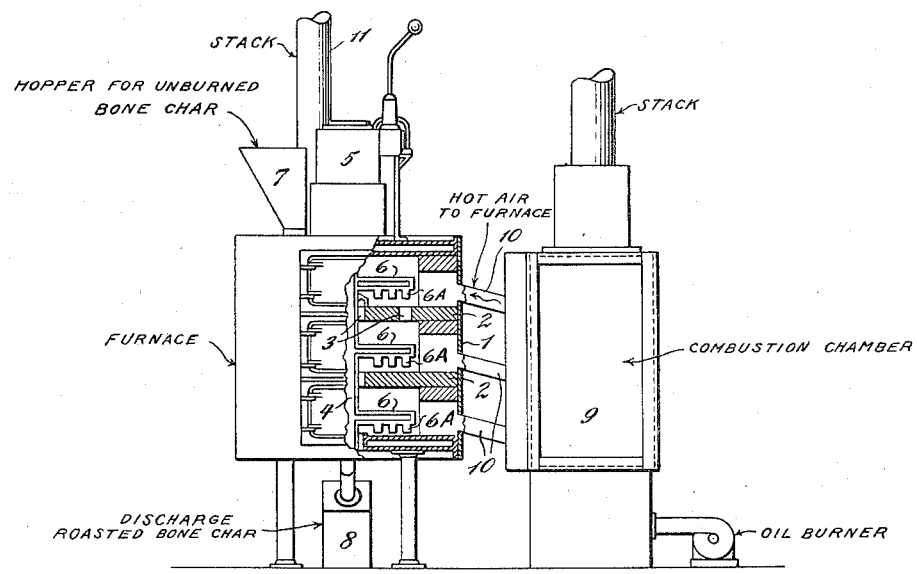

July 23, 1940.                F. A. BODENHEIM ET AL                2,209,069
                            ADSORBENT MATERIAL AND PROCESS
                            Filed Oct. 19, 1938        2 Sheets-Sheet 1

INVENTOR
F. A. BODENHEIM
CLARENCE E. HEATH
BY Gifford, Scull & Burgess
ATTORNEYS Patented July 23, 1940

2,209,069

UNITED STATES PATENT OFFICE 2,209,069

ADSORBENT MATERIAL AND PROCESS

Francis A. Bodenheim, Kew Gardens, N. Y., and Clarence E. Heath, Dedham, Mass., assignors to Applied Sugar Laboratories, Inc., New York, N. Y., a corporation of New York Application October 19, 1938, Serial No. 235,814

12 Claims. (Cl. 127—55)

One of the objects of this invention is to devise a novel adsorbent and method of making.

Another object is to provide a novel and simple process of revivification of the adsorbent.

The known methods of revivifying bone char comprise a process of destructively distilling the char. The carbon in this char is tightly held in a matrix of bone structure or skeleton and the object of the known methods is to keep the carbon in that close union and to restore it to its previous condition insofar as possible. In other words the carbon which is a constituent of the bone char is used repeatedly without separating it from the char.

Efforts have been made to make reconstructed or artificial bone chars by burning off the carbon and then redepositing carbon therein. In these chars, however, the carbon, after performing its decolorizing function, is not removed. It is subjected to revivification by the well known destructive distillation process, just as in the case of ordinary bone char. Indeed, the methods by which such artificial bone char have been made do not tend to produce a char from which the carbon can be removed except by a process of burning it off. For example, spent bone char from which the carbon has been burned off, has been mixed with organic material and the mixture subjected to charring or destructive distillation, to carbonize the organic material in intimate union with the bone skeleton, thus producing an artificial bone char.

In accordance with one embodiment of our invention, spent bone char is denuded of carbon as for example by a controlled process of combustion, leaving what may be called an incinerated bone char or ash which may be referred to as bone char "skeleton." This is then mechanically mixed with a small proportion of an activated carbon and it is found that this mixture possesses certain remarkable properties. First, it has a very high decolorizing capacity. Secondly, while in contact with sugar syrup, i. e., when sugar syrup is percolated through the mixture, the carbon remains in union with the skeleton to such an extent that the filtrate is clear. Thirdly, when the spent mixture is agitated with water the carbon with adsorbed impurities from the sugar solution readily separates. The washing also removes impurities adsorbed by the said skeleton.

Then the residual skeleton from which the carbon has separated, can be mixed with a fresh charge of carbon. Thus the process of regeneration comprises a separation, e. g. a "washing out" of the spent carbon and replacement thereof by fresh carbon.

Thus in contrast to prior methods by which it has been attempted to use the same mass of carbon over and over again by revivifying it, i. e., heating it to high temperatures, the present invention provides a quite different procedure. The carbon, in accordance with the present invention, need not be itself revivified at all. Rather it is separated when its decolorizing power is exhausted and this separation may be accomplished by merely agitating with water.

The principles of the invention will be further illustrated by describing certain specific embodiments thereof. With this teaching others will be enabled to devise equivalent embodiments not specifically described but within the scope of said principles which will be defined in the claims ultimately appended hereto.

Preparation of adsorbent

In one embodiment of our invention, spent bone char, preferably from sucrose refining, is decarbonized by burning off the carbon and obtaining a residual skeleton. This is then mixed with a small proportion of activated carbon.

Referring to Fig. 1 of the accompanying diagram the furnace shown comprises a shell 1 divided into a series of compartments by shelves 2. Alternate shelves are provided with holes 3 near the periphery and center, respectively. Central shaft 4 is rotated by suitable mechanism operated by motor 5. Radial arms 6 carry depending fingers 6A. Hopper 7 receives spent bone char and bin 8 collects the bone skeleton from which carbon has been separated by combustion. Combustion gases carrying excess air for combustion of carbon, are generated in the oven 9 and are delivered to the furnace by appropriate ports 10. Waste gases are educted through the stack 11.

The operation of the furnace includes the following steps:

Spent bone char from the hopper 7 is delivered to the uppermost of the shelves 2 and by the rotation of the arms 6 and fingers 6A is progressively moved across the shelves in alternate directions and finally into the bin 8. In its travel the bone char is incinerated or burned and carbon thereby removed.

Careful attention to conditions during the burning off process should be observed in order to get the most satisfactory skeleton for subsequent mixing with the carbon. The constituents of spent bone char include about 12% carbon, 80% tricalcium phosphate, 4% calcium carbonate, 2% calcium sulfate and sulfide, 1% silica, and 1% calcium and iron oxide. Excessive temperatures cause decomposition of calcium carbonate with production of a very high content of calcium oxide which may be disadvantageous because it raises the pH of syrups treated with said skeleton, resulting in darkening of those syrups.

The preferred temperature range is about 800° F. to 1000° F. in the presence of air. The temperature and time are however reciprocal and these variables may be so correlated that only a part of the calcium carbonate is converted into carbon dioxide and lime.

After incineration the residual skeleton is cooled and is then ready for mixing with activated carbon. This is preferably used in finely divided form. It may be mixed mechanically with the bone skeleton by a dry or wet process. In the dry process the activated carbon in an amount which may be equal to about two per cent of the bone skeleton by weight is mixed with the bone skeleton in any suitable mixing device, care being taken, however, not to break down the skeleton particles.

The skeleton when intimately contacted with the activated carbon will absorb or take up a certain proportion of carbon from which the carbon will separate by washing but from which it will not readily separate by handling. The skeleton becomes saturated with the carbon and the proportion of carbon should not substantially exceed this saturation point, otherwise the efficiency of the combination is reduced due to premature separation of carbon. It is that carbon which is in immediate association or combination with the skeleton which is desired. Excessive carbon may be called free carbon and that is not desired because the excess not only separates as a dust but also may stratify in the filter and cause clogging.

Around two per cent of activated carbon is a desirable maximum. The attainment of this maximum is facilitated by having a certain proportion of moisture present. This can be supplied by controlling the humidity of the air in the mixing device so that the air is partially saturated with moisture. Complete saturation should be avoided so as to prevent the precipitation of water in liquid form.

Figure 2:
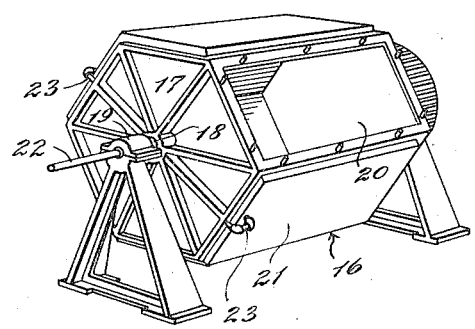
Figure 3:
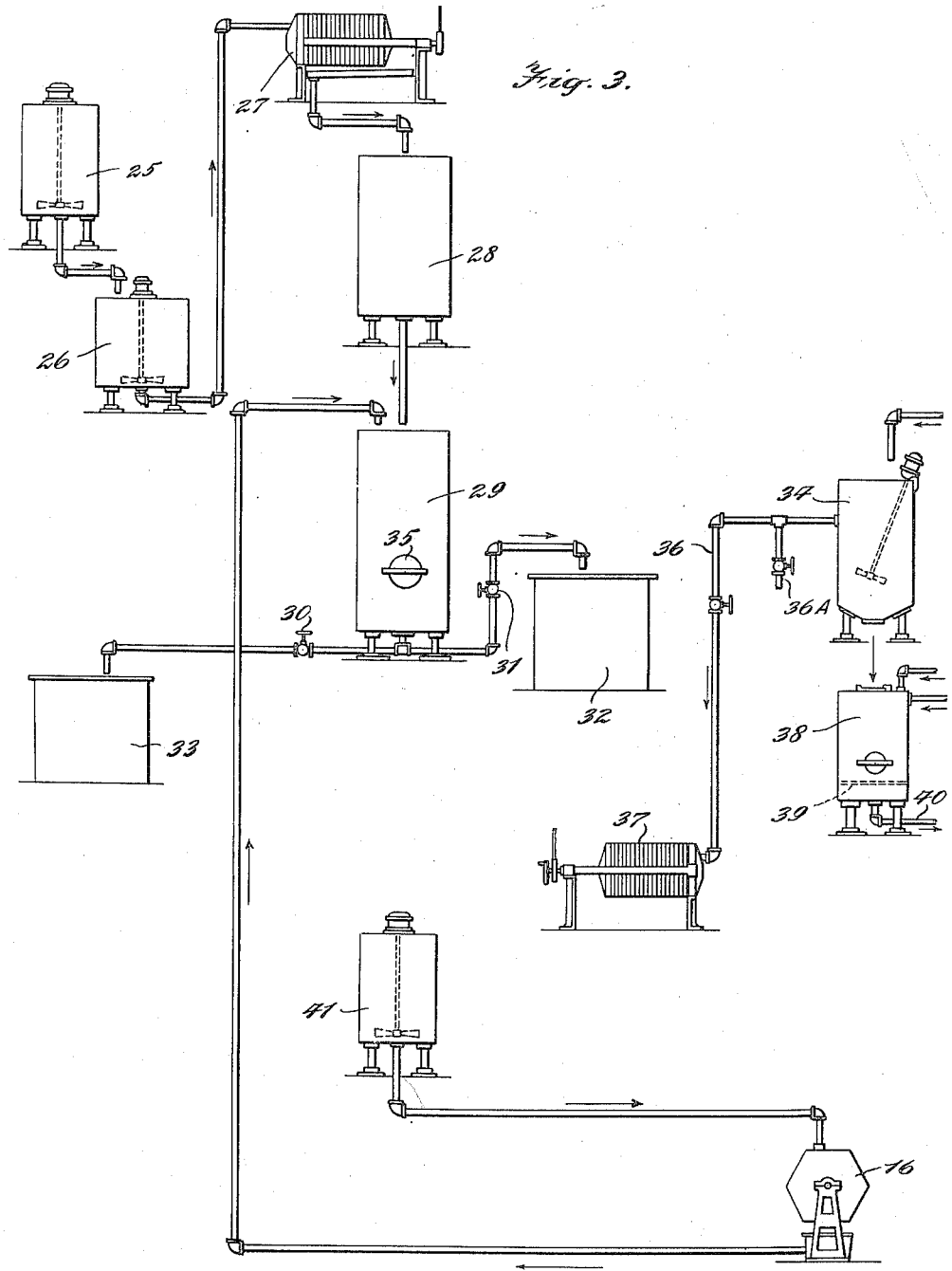

Instead of the dry process it has been discovered that a substantial improvement may be effected by mixing the carbon and skeleton together with a liquid. If the skeleton and carbon are to be used for decolorizing sugar syrups, this liquid may advantageously be a sugar syrup having a density of, say, 60 Brix. In a typical case 4 pounds of activated carbon and 90 pounds of sugar syrup having a density of about 55 to 68 degrees Brix are mixed in the mixer 41 shown in Fig. 3 and this mixture is then charged into the mixer 16 shown in Figs. 2 and 3, which has previously been charged with about 200 pounds of skeleton. All the ingredients are then thoroughly mixed by rotation of said mixer 16. This has a shell 17 provided with stub shafts 18 mounted on bearings 19 and provided with suitable means (not shown) to effect rotation. It is also provided with a charging and discharging door 20 and a steam jacket 21 supplied with steam through pipes 22 and 23 and a suitable stuffing box. The temperature during mixing may be regulated, as by means of the steam jacket, to control the consistency of the mixture as may be desired. This mixture is then ready for use as a decolorizing or adsorbent material.

One of the numerous applications of the adsorbent is its use in decolorizing sucrose syrups by percolation. This application of the adsorbent will be described for the sake of illustration by reference to Fig. 3 which shows a flow sheet of such a process.

A sugar solution having a density of 60 to 65 Brix is made up in the melting tank 25 and is then transferred to tank 26 where it is treated with a clarifying agent or filter aid such as diatomaceous earth, to remove suspended solid impurities. Both tanks are provided with agitators as shown. The syrup after agitation with the clarifying agent in tank 26 is filtered in the filter 27 and the clear filtrate is delivered to tank 28, provided with heating means to maintain the contents at about 175° F. to 190° F.

It is then delivered to the percolator 29 which contains the skeleton-carbon combination previously described and the syrup is percolated through the said filtering material.

By keeping valve 30 closed and valve 31 open, the filtrate is delivered to tank 32.

The filter material in tank 29 is then washed with water, and the filter washings or "sweet water" are delivered to tank 33. This is delivered to tank 25 to assist in making up the original charge of syrup. During this washing process, as also during the syrup filtration, the carbon remains in union with the skeleton.

This completes the filtration cycle. The next step is the separation of carbon from the skeleton. This may be done by agitation with water. This is accomplished by transfer of the filter medium from tank 29 to the tank 34 provided with an agitator, as shown, and agitation with water preferably heated to about 210° F. Manhole 35 is provided to facilitate removal of the filter medium to tank 34. This agitation with water causes separation of the carbon with of course its adsorbed impurities. Agitation is then stopped. The skeleton sinks to the bottom of tank 34, but the carbon remains suspended in the water and the water-spent carbon suspension is drawn off through pipe 36 and passed through filter 37. The filtrate is substantially pure water and may be reutilized for washing in the tank 34. This washing is repeated until separation of the carbon from the skeleton is substantially complete. The carbon filter cake from the filter 37 may be discarded but is preferably utilized in tank 26 as a constituent of the clarifying material. The water-spent carbon mixture may be sluiced to the sewer through pipe 36A.

The washing process, in addition to removing the carbon, has a washing and purifying action on the skeleton and, as already stated, the washed skeleton settles to the bottom of tank 34 as a slurry. The slurry is sluiced to closed tank 38 provided with a screen 39. By applying compressed air and/or steam to this tank considerable free water is separated and drained off to the sewer through pipe 40. The wet bone skeleton, substantially freed from carbon and impurities, is then ready for directly mixing with fresh or virgin activated carbon in the mixer 16, said carbon having previously been mixed with syrup in mixer 41 in the manner already described. In the washing process it is desirable to impart a slight alkalinity to the wash water which has the effect of facilitating removal of impurities from the skeleton and alkalizing the skeleton, thus increasing the adsorptive power of said skeleton.

It will thus be noted that as contrasted with the process of revivification at high temperatures the present invention provides for a combination of bone skeleton and activated carbon which is regenerated by removing the spent carbon by a simple mechanical separation and replacing it with fresh or virgin carbon. Thus the cumbersome and expensive high temperature revivification process and the apparatus incident thereto are done away with.

The art now recognizes two conventional processes of treatment of sugar syrups with carbon, viz., (1) filtration or percolation through bone char and (2) agitation with activated carbon followed by filtration in a filter press. In a bone char filtration or percolation at least about 35 per cent of char is necessary based on the solid sugar employed in so-called refinery melt liquor. To accomplish the same degree of decolorization, only about 10 per cent of the adsorbent of this invention is necessary. Furthermore, since the relatively cheap spent bone char may be used to make the material employed by this invention, instead of the more expensive virgin bone char, the material cost is thereby lowered. Therefore not only a substantial saving on the quantity and cost of the adsorbent as such but also a greatly increased capacity of the percolators and a consequent saving in the cost of equipment and operation may be realized.

The conventional process of decolorizing sugar syrups with activated carbon comprises mixing the activated carbon with the syrup and filtration of the mixture in a filter press to remove the carbon. The cost of such presses and their operation is substantial. The adsorbent of the present invention utilizes activated carbon in such a way that percolation is made possible. Furthermore substantially less carbon (in a typical case 80% less) is required in the combination in which it is used in the present invention, to accomplish a given degree of decolorization, than when used according to the conventional methods by which activated carbon is commonly used.

Some activated carbons are most efficient only under acid conditions, a fact which impairs their usefulness in cases where inversion of sucrose and other polysaccharides is to be avoided. This adsorbent of this invention is free from that disadvantage. Moreover it removes non-sugars as well as coloring matter. In a typical case 200 per cent more non-sugars were removed by the adsorbent of this invention than were removed by conventional activated carbon.

It may be stated that the adsorbent of this invention combines certain advantages of activated carbon and bone char respectively and possesses certain other advantages not possessed by either of these adsorbents.

There are various grades of bone char employed or produced in sugar refiners, which may be listed as follows:

1. Virgin bone char.
2. Bone char which has been revivified at high temperatures and has also been classified, i. e., separated from the heavy particles thereof which have absorbed mineral matter, and also from the fines.
3. The heavy particles separated as above mentioned in 2.
4. The fine screenings mentioned in 2.

The material used by sugar refineries repeatedly, i. e., after repeated revivification, is the material mentioned in 2 above. This material finally reaches the stage where it is substantially exhausted and is unsuitable for further revivification. This material may be designated as number 5.

In accordance with the present invention all of the above grades of bone char can be used, i. e., submitted to combustion as described herein, with the qualification that the material defined in item numbered 3 above is so charged with inorganic material that its use in the present invention is not preferred. The preferred source of the ash or skeleton of the present invention is material No. 5 above mentioned.

It is also possible to start with ordinary bone structure or steamed bone and incinerate the same without passing through the intermediate step of carbonization. In accordance with the present invention activated carbon is incorporated with the mineral structure of bone, in subdivided or comminuted form. There is a variation in the mineral and organic structure of bone from different sources and parts of the anatomy. In the manufacture of bone char the relatively harder portions of the anatomy are selected and when this material is burned the resulting mineral bone structure or skeleton is particularly suitable.

If skeleton from virgin bone char is used, it has been found desirable to reduce the particle size thereof to approximately that corresponding to between 30 and 80 mesh and to control the pH of the skeleton made therefrom, which may be done by treating said skeleton with dilute acid until the pH of skeleton (as measured by water washings thereof) is about 7 to 8.

In the furnace (see Fig. 1) suitable means, e. g., dampers, not specifically shown, are provided to control the volume of gas educted through the stack and directed through ports 10, respectively.

We claim:

1. An adsorbent material comprising activated carbon incorporated with the mineral structure of bone, said carbon being capable of separation from said mineral structure of bone by agitation with water.

2. An adsorbent material comprising activated carbon incorporated with decarbonized bone char, said carbon being capable of separation from the decarbonized bone char by agitation with water.

3. The process which comprises mechanically incorporating decarbonized bone char with activated carbon and a sugar solution and thereby obtaining material capable of removing color from sugar solutions and other liquids when contacted therewith by percolation.

4. The process which comprises mechanically incorporating decarbonized bone char with activated carbon and a sugar solution and thereby obtaining an adsorbent material, percolating through said material a sugar solution containing coloring matter and effecting a predetermined removal of color from said solution, and regenerating said adsorbent material by separating spent activated carbon therefrom and mechanically incorporating activated carbon with the adsorbent material from which spent activated carbon has been separated.

5. The process of regenerating adsorbent material comprising activated carbon mechanically incorporated with decarbonized bone char which material has been contacted with a liquid and has removed impurities from said liquid, which comprises agitating said material with water and thereby separating spent activated carbon from the decarbonized bone char and mechanically incorporating therewith activated carbon.

6. A material adapted to purify sugar solutions by percolation of said solutions through said material comprising a mixture of activated carbon, decarbonized incinerated bone char and sugar solution in the proportion of about 4 pounds activated carbon, about 200 pounds decarbonized incinerated bone char and about 90 pounds of sugar syrup having an approximate density of 55 to 68 degrees Brix at about 25° C., the carbon being capable of separation from said mixture by agitation with water.

7. An adsorbent material, adapted for the purification of liquids by percolation, comprising activated carbon mechanically incorporated with the mineral structure of bone in a proportion not substantially exceeding that at which the said structure is saturated with the activated carbon, said carbon being readily separable from the said mineral bone structure by agitation with water but not readily separable during percolation or by handling.

8. An adsorbent material, adapted for the purification of liquids by percolation, comprising activated carbon mechanically incorporated with decarbonized bone char in a proportion not substantially exceeding that at which the said structure is saturated with the activated carbon, said carbon being readily separable from the said mineral bone structure by agitation with water but not readily separable during percolation or by handling.

9. An adsorbent material comprising activated carbon mechanically incorporated with the mineral structure of bone, the ratio of carbon to bone structure being about 2 per cent by weight.

10. An adsorbent material comprising activated carbon mechanically incorporated with decarbonized bone char, the ratio of carbon to bone structure being about 2 per cent by weight.

11. The process of making an adsorbent material adapted to purify a liquid which comprises wetting a body of activated carbon by mixing it with a portion of the liquid to be purified in an amount sufficient to wet said carbon and mixing the wetted activated carbon with the mineral structure of bone.

12. The process which comprises percolating a sugar solution through an adsorbent material comprising activated carbon incorporated with decarbonized bone char, percolating water through said adsorbent material to wash it, agitating said washed adsorbent material with water and thereby separating spent activated carbon from the decarbonized bone char and obtaining a slurry comprising said bone char and excess water, separating the excess water therefrom and obtaining said bone char in the form of a wet mass substantially free from said spent carbon and capable of being mixed with fresh activated carbon.

FRANCIS A. BODENHEIM.
CLARENCE E. HEATH.